United States Patent
Maeda et al.

(10) Patent No.: US 6,671,192 B2
(45) Date of Patent: Dec. 30, 2003

(54) POWER APPARATUS

(75) Inventors: Shiro Maeda, Shiga (JP); Kazuhiro Harada, Hyogo (JP); Yasuhisa Ninomiya, Shiga (JP); Akihiro Kyogoku, Kyoto (JP); Tomohiro Sugimoto, Shiga (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/239,784

(22) PCT Filed: Jan. 24, 2002

(86) PCT No.: PCT/JP02/00497

§ 371 (c)(1),
(2), (4) Date: Mar. 31, 2003

(87) PCT Pub. No.: WO02/060044

PCT Pub. Date:Aug. 1, 2002

(65) Prior Publication Data

US 2003/0165070 A1 Sep. 4, 2003

(30) Foreign Application Priority Data

Jan. 26, 2001 (JP) .......................................... 2001-18202

(51) Int. Cl.[7] .............................................. H02M 1/12
(52) U.S. Cl. ............................... 363/44; 363/81; 363/89
(58) Field of Search ............................. 363/39, 44, 81, 363/82, 89, 90, 125, 126

(56) References Cited

U.S. PATENT DOCUMENTS

| | | | |
|---|---|---|---|
| 4,625,272 A | * 11/1986 | Okuyama et al. | 363/81 |
| 5,751,567 A | * 5/1998 | Toyozaki et al. | 363/89 |
| 5,793,624 A | * 8/1998 | Couture et al. | 363/89 |
| 6,304,465 B1 | * 10/2001 | Takita | 363/37 |
| 6,320,772 B1 | * 11/2001 | Doyama et al. | 363/89 |
| 6,407,936 B1 | * 6/2002 | Tang | 363/44 |

FOREIGN PATENT DOCUMENTS

| | | |
|---|---|---|
| EP | 1 033 806 | 9/2000 |
| JP | 11-313487 | 11/1999 |
| JP | 2000-295853 | 10/2000 |

* cited by examiner

Primary Examiner—Michael Sherry
Assistant Examiner—Gary L Laxton
(74) Attorney, Agent, or Firm—Wenderoth, Lind & Ponack, L.L.P.

(57) ABSTRACT

The present invention discloses a power apparatus with the output voltage thereof made variable, which allows harmonics to be suppressed while an enhanced power factor being maintained. The power apparatus comprises an alternating current power source, a bridge rectifier circuit to subject alternating currents from the alternating current power source to full-wave rectification, a reactor connected between the alternating current power source and the alternating current input end of the bridge rectifier circuit and a capacitor connected via a bi-directional switch between the alternating current input end and the direct current end of the bridge rectifier circuit, further comprising a smoothing capacitor, a zero-crossing detecting means, a bi-directional switch drive signal generating means and a bi-directional switch driving means.

8 Claims, 5 Drawing Sheets

1

POWER APPARATUS

FIELD OF THE INVENTION

The present invention relates to a power apparatus to supply electric power to equipment, systems and the like by the use of a rectifying system formed of a bridge rectifier circuit.

BACKGROUND OF THE INVENTION

A variety of rectifying systems utilizing diodes has been known for long time. FIG. 7 shows a typical full-wave rectification circuit utilizing a bridge rectifier circuit. The full-wave rectification circuit of FIG. 7 has a bridge rectifier circuit formed of four of diodes 2 to 5. Reference numeral 11 indicates a load.

FIG. 7(a) is a diagram to show an electric current flow from alternating current power source 1 during negative half a cycle of the alternating current. The electric currents flow through diode 4, smoothing capacitor 7 and diode 3 in this order, thereby allowing positive voltage Vo to be tapped off. More specifically, an alternating input from alternating current power source 1 is subjected to full-wave rectification and a positive direct current voltage is obtained.

However, a prior art power apparatus as described in above presents such problems as a low power factor and an increased content of power supply harmonics since input currents flow only during the period when the voltage of alternating current power source 1 is higher than the direct current output voltage.

As a general countermeasure to solve the foregoing problems, a method of connecting a reactor between alternating current power source 1 and bridge rectifier circuit 6 is adopted. Although this method allows the generation of harmonics to be suppressed, the power factor ends up with just reaching about 70% or so. As a result, in order to realize a power apparatus with a power capacity ranging from an intermediate capacity to a large capacity, there have risen such problems as causing the component elements used therein to become large in size with a resulting increase in the size of the power apparatus and taxing on the electric power source systems involved.

DISCLOSURE OF THE INVENTION

The present invention deals with the foregoing problems and aims at providing a power apparatus whereby both a high power factor and suppression of harmonics are allowed to be achieved.

A power apparatus of the present invention comprises:
an alternating current power source;
a bridge rectifier circuit to subject alternating currents from the alternating current power source to full-wave rectification; and
a smoothing capacitor connected across direct current output ends of the bridge rectifier circuit, further comprising:
 a reactor connected between the alternating current power source and the alternating current input end of the bridge rectifier circuit;
 a capacitor connected via a bi-directional switch between the alternating current input end and the direct current output end of the bridge rectifier circuit;
 a zero-crossing detecting means to detect a zero voltage point of the alternating current power source;
 a bi-directional switch drive signal generating means to generate a drive signal for the bi-directional switch based on an output of the zero-crossing detecting means; and
 a bi-directional switch driving means to drive the bi-directional switch based on a signal of the bi-directional switch drive signal generating means.

According to the structure as described in above, turning on the bi-directional switch at a suitable phase and for a suitable conducting duration allows both the suppression of harmonics in input currents and the enhanced power factor to be realized and also allows a higher direct current output voltage than the peak voltage of the alternating current power source to be obtained. In addition, it is made possible for the value of the direct current output voltage to be controlled.

It is preferred that the power apparatus of the present invention is provided with a power source frequency detecting means to set specified time Δd from zero-crossing to a different fixed value based on power source frequencies, thereby allowing the control of the bi-directional switch to be facilitated.

It is preferred that the bi-directional switch drive signal generating means generates an on-signal at specified time Δd (0≦Δd) from a zero-crossing of the input voltage and generates an off-signal at specified time Δt (0≦Δt) after the on-time, thereby enabling the controlling of both the harmonics in input currents from the alternating current power source and the output voltage appearing across both ends of the smoothing capacitor.

It is further preferred that the variable range of specified time Δt after the on-time is limited to less than conducting duration Δ to of the bi-directional switch for generating a direct current output voltage needed at the time of a maximum load, thereby allowing the output voltage to be prevented from increasing to a higher value than necessary at the time of low loading.

It is preferred that the power apparatus of the present invention has a load detecting means and also has a storing means inside of the bi-directional switch drive signal generating means to store in advance a combination of specified time Δd from the zero-crossing and specified time Δt after the on-time, both being determined according to the magnitude of load, and further selectively retrieves from the storing means based on the output of the load detecting means a combination of specified time Δd from the zero-crossing and specified time Δt after the on-time according to the magnitude of load, thereby allowing the power apparatus to be operated constantly at the optimum point of performance against a variety of changes in loading condition.

DETAILED DESCRIPTION OF THE PREFERRED EMBODIMENTS

Next, a description is given to exemplary embodiments of the present invention with reference to drawings.

Exemplary Embodiment 1

Figure 1:
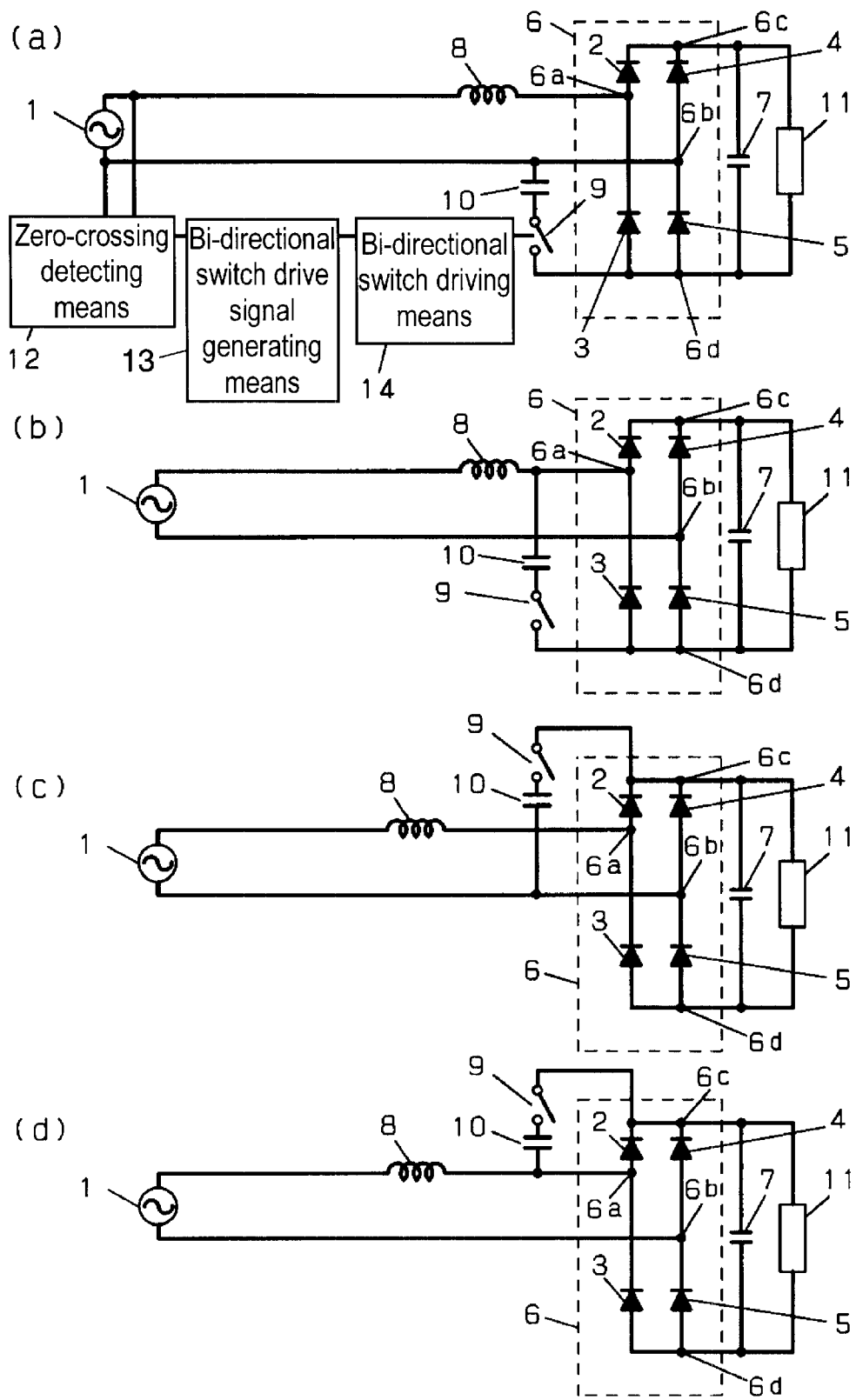
FIG. 1(a) is a block diagram of a power apparatus in exemplary embodiment 1 of the present invention.
FIG. 1(b) is a block diagram of another power apparatus in exemplary embodiment 1 of the present invention.
FIG. 1(c) is a block diagram of still another power apparatus in exemplary embodiment 1 of the present invention.
FIG. 1(d) is a block diagram of still another power apparatus in exemplary embodiment 1 of the present invention.

FIG. 1 shows block diagrams, each illustrating the structure of a power apparatus in an exemplary embodiment of the present invention. Each respective power apparatus of FIG. 1(a), FIG. 1(b), FIG. 1(c) and FIG. 1(d) is provided with bridge rectifier circuit 6 formed of four diodes of diodes 2 to 5 and alternating current power source 1. There are reactor 8 connected between alternating current power source 1 and the alternating current input end of bridge rectifier circuit 6 and capacitor 10 connected between the alternating current input end and the direct current output end of bridge rectifier circuit 6.

In the block diagrams of FIG. 1(a) and FIG. 1(b), capacitor 10 is connected between alternating current end 6a or 6b and negative direct current output end 6c of bridge rectifier circuit 6 via bi-directional switch 9, and in the block diagrams of FIG. 1(c) and FIG. 1(d), capacitor 10 is connected between alternating current end 6a or 6b and positive direct current output end 6d of bridge rectifier circuit 6.

Further, smoothing capacitor 7 is connected between positive direct current output end 6d and negative direct current output end 6c of bridge rectifier circuit 6, thereby making it possible for the violently changing direct currents from bridge rectifier circuit 6 to be smoothed out as a direct current.

In addition, each respective power apparatus of the foregoing has zero-crossing detecting means 12 to detect zero-crossing of the voltage of alternating current power source 1, bi-directional switch drive signal generating means 13 to generate a drive signal for bi-directional switch based on an output of zero-crossing detecting means 12 and bi-directional switch driving means 14 to drive bi-directional switch 9 based on an output of bi-directional switch drive signal generating means 13. In FIG. 1(b) to FIG. 1(d), the entries of zero-crossing detecting means 12, bi-directional switch drive signal generating means 13 and bi-directional switch driving means 14 are omitted.

Next, a description is given to how the power apparatus of FIG. 1(a) operates with reference to FIG. 2(a) to FIG. 2(d).

Figure 2:
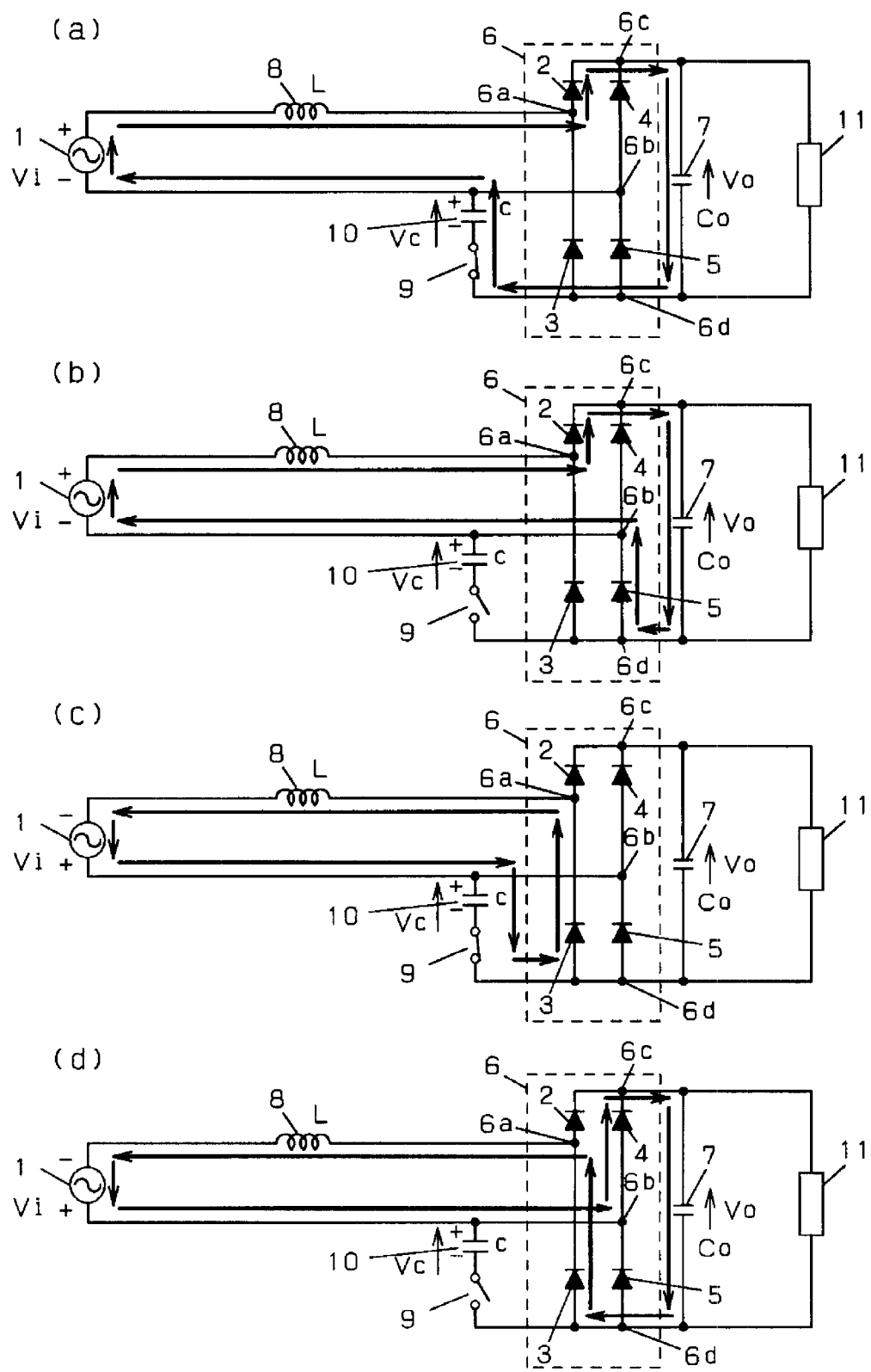
FIG. 2(a) is an operational illustration of a power apparatus in exemplary embodiment 1 of the present invention.
FIG. 2(b) is an operational illustration of another power apparatus in exemplary embodiment 1 of the present invention.
FIG. 2(c) is an operational illustration of still another power apparatus in exemplary embodiment 1 of the present invention.
FIG. 2(d) is an operational illustration of still another power apparatus in exemplary embodiment 1 of the present invention.
Figure 3:
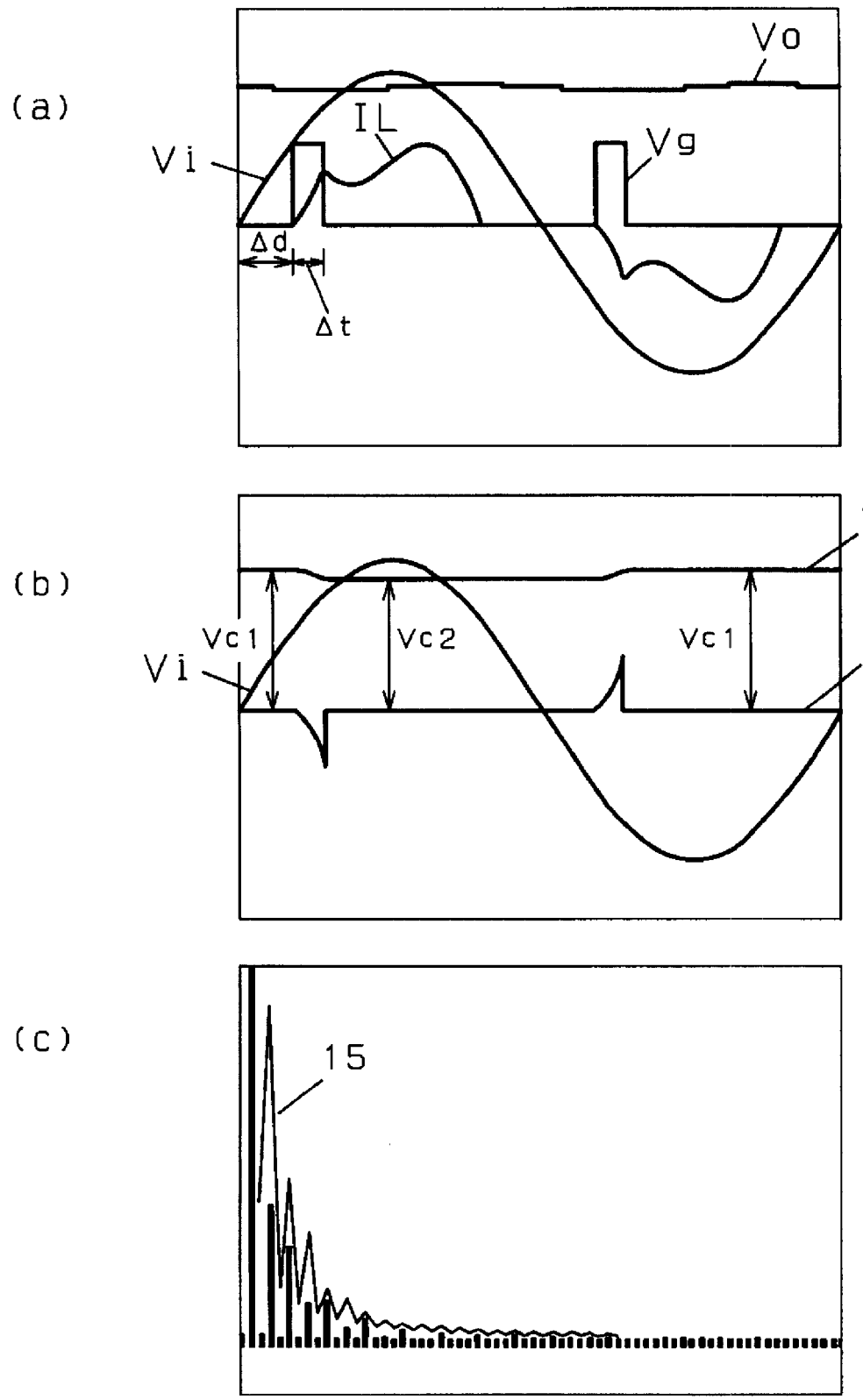
FIG. 3(a) is a diagram to show the waveforms of alternating input voltage Vi, reactor current IL, direct current output voltage Vo and bi-directional switch driving signal voltage Vg of a power apparatus in exemplary embodiment 1 of the present invention.
FIG. 3(b) is a diagram to show the waveforms of alternating input voltage Vi, capacitor current Ic and capacitor voltage Vc of a power apparatus in exemplary embodiment 1 of the present invention.
FIG. 3(c) is a diagram to show the comparison between harmonic components of a power apparatus in exemplary embodiment 1 of the present invention and the Japanese domestic guide line relative to the regulation on harmonics.

FIG. 2(a) and FIG. 2(b) illustrate what takes place in the power apparatus during the positive half period of alternating input voltage Vi, and FIG. 2(c) and FIG. 2(d) illustrate what takes place during the negative half period of the same. FIG. 3(a) and FIG. 3(b) show the performance of the power apparatus of FIG. 1(a) in terms of waveforms at various points and the like of the unit under the conditions that Vi is 200 V, L is 10 mH, C is 300 $\mu$F and Co is 1800 $\mu$F.

More specifically, FIG. 3(a) shows the respective waveforms of alternating input voltage Vi, currents IL (alternating input current) flowing in reactor 8, direct current output voltage Vo and bi-directional switch driving signal voltage Vg and FIG. 3(b) shows the respective waveforms of alternating input voltage Vi, currents Ic flowing in capacitor 10 and voltage Vc across both ends of capacitor 10.

Under the foregoing conditions, bi-directional switch 9 is turned off immediately after the zero-crossing of alternating input voltage Vi in a positive alternating half period, direct current output voltage Vo is higher than alternating input voltage Vi and diodes 2 and 5 are reverse-biased, thereby allowing no input currents to be flowing.

At this time, since capacitor 10 is charged during the period of one period before, capacitor voltage Vc shows the voltage magnitude of Vc1 with the polarity as shown in the drawing. In specified time Δd after alternating input voltage Vi crosses the zero point from the negative period domain to the positive period domain, bi-directional switch drive signal generating means 13 generates an on-signal for bi-directional switch 9 and electric currents start flowing in the direction indicated by an arrow in FIG. 2(a) upon turning on bi-directional switch 9 through bi-directional switch driving means 14. In other words, electric currents flow from alternating current power source 1 through reactor 8, diode 2, smoothing capacitor 7 and capacitor 10 in succession, thereby causing capacitor 10 to discharge and ending up with a resulting reduction of capacitor voltage Vc to Vc1 or less. The specified time Δd from the zero-crossing point is selected so as to have the summation of alternating input voltage Vi and capacitor voltage Vc1 of capacitor 10 made larger than direct current voltage Vo of smoothing capacitor 7, thereby making bi-directional switch 9 turn on.

Then, in specified time Δt after the turning-on time of bi-directional switch 9, bi-directional switch drive signal generating means 13 generates an off-signal for bi-directional switch 9 and, upon turning off bi-directional switch 9 through bi-directional switch driving means 14, electric currents flow from alternating current power source 1 through reactor 8, diode 2, smoothing capacitor 7 and diode 5 in succession while capacitor 10 maintaining capacitor voltage Vc2 at the time of turning bi-directional switch 9 off, thereby causing capacitor voltage Vc to be reduced to zero finally due to the decline of alternating input voltage Vi.

Bi-directional switch 9 is turned off immediately after the zero-crossing of alternating input voltage Vi in a negative alternating half period, direct current output voltage Vo is higher than alternating input voltage Vi and diodes 3 and 4 are reverse-biased, thereby allowing no input currents to be flowing. In specified time Δd after alternating input voltage Vi crosses the zero point from the positive period domain to the negative period domain, bi-directional switch drive signal generating means 13 generates an on-signal for bi-directional switch 9 and electric currents start flowing in the direction indicated by an arrow in FIG. 2(c) upon turning on bi-directional switch 9 through bi-directional switch driving means 14. In other words, electric currents flow from alternating current power source 1 through capacitor 10, diode 3 and reactor 8 in succession, thereby causing capacitor 10 to be charged. Then, in specified time Δt after the turning-on time of bi-directional switch 9, bi-directional switch drive signal generating means 13 generates an off-signal for bi-directional switch 9 and, upon turning off bi-directional switch 9 through bi-directional switch driving means 14, capacitor 10 maintains capacitor voltage Vc1 by being charged up to that voltage level of Vc1 and electric currents flow from alternating current power source 1 through diode 4, smoothing capacitor 7, diode 3 and reactor 8 in succession, as FIG. 2(d) shows, and finally capacitor voltage Vc is reduced to zero due to the decline of alternating input voltage Vi.

Accordingly, by having capacitor 10 charged/discharged, the input currents are allowed to flow at a point of time closer to the zero-crossing point of the input voltage than with a prior art power apparatus, thereby achieving the enhancement of power factor.

By increasing specified time Δt after the turning-on time of bi-directional switch 9, the amount of magnetic energy stored in reactor 8 and also the amount of electricity charged in capacitor 10 are increased, thereby allowing output voltage Vo to be increased. Conversely, by decreasing specified time Δt after the turning-on time of bi-directional switch 9, output voltage Vo is allowed to be decreased. Thus, by adjusting specified time Δt after the turning-on time of bi-directional switch 9, output voltage Vo is made variable.

In addition, since the electric currents flowing in the power apparatus are series resonance currents flowing through reactor 8 and capacitor 10 or smoothing capacitor 7, the electric currents increase less abruptly in comparison with the case where a reactor is used to form a short circuit as seen generally in a step-up circuit, thereby making it possible for the whine of reactor 8 to be suppressed. Further, the series resonance currents due to reactor 8 and capacitor 10 or smoothing capacitor 7 have no high frequency ringing components and therefore, by making an appropriate selection of inductance L of reactor 8, capacitance C of capacitor 10, specified time Δd from the zero-crossing point and specified time Δt after the turning-on time, harmonics can be effectively prevented from being generated. FIG. 3(c) shows an example of the comparisons between the harmonic components of the input current and the Japanese domestic guide line 15 relative to the regulation on harmonics. It is found out from FIG. 3(c) that the harmonic components of the input current are less than the limits of the guide line in magnitude. In FIG. 3(c), the horizontal axis shows the order of harmonics and the vertical axis shows the magnitude of electric currents.

Although a description is given to how the power apparatus of FIG. 1(a) performs in the foregoing, the power apparatuss of FIG. 1(b) to FIG. 1(d) perform in the same way as the power apparatus of FIG. 1(a) and therefore the descriptions thereof are omitted here.

Exemplary Embodiment 2

A power apparatus in exemplary embodiment 2 of the present invention is characterized by limiting the variable range of specified time Δt after the turning-on time not to exceed conducting duration Δ to of the bi-directional switch, during which a direct current output voltage needed for the maximum load is generated. As FIG. 2(c) shows, the power apparatus of the present invention is characterized by storing energy in reactor 8 and capacitor 10 in the conducting duration of bi-directional switch 9 during half a negative cycle of alternating current input voltage Vi and releasing the foregoing stored energy to smoothing capacitor 7 during half a positive cycle of alternating current input voltage Vi. In other words, the power apparatus of the present invention has the so-called step-up action.

Figure 4:
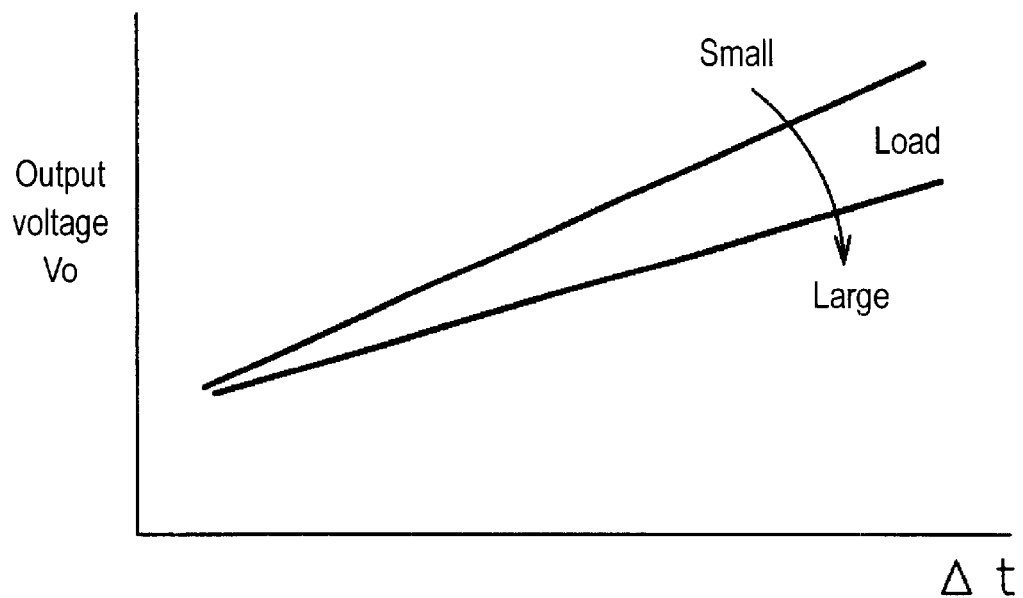
FIG. 4 is a diagram to show the relationships between Δt and output voltage Vo changing according to the magnitude of load for power apparatuss in exemplary embodiments 1 and 2 of the present invention.

As FIG. 4 shows, output voltage Vo increases as specified time Δt after the turning-on time increases and the value of output voltage Vo is dependent on the magnitude of load, thereby making output voltage Vo after the same turning-on time the higher as the magnitude of load becomes the smaller. Therefore, there is a possibility of making output voltage Vo extraordinarily high when specified time Δt after the turning-on time is made excessively large under light load, thereby bringing output voltage Vo to a level that exceeds the withstand voltage of smoothing capacitor 7.

In order to prevent the foregoing from taking place, the maximum value of specified time Δt after the turning-on time is limited to less than conducting duration Δ to, during which output voltage Vo needed for the maximum load is generated, as described before. Accordingly, the conducting duration of bi-directional switch 9 is limited to less than Δto even under light load, thereby allowing the output voltage to be prevented from increasing extraordinarily.

Exemplary Embodiment 3

Figure 5:
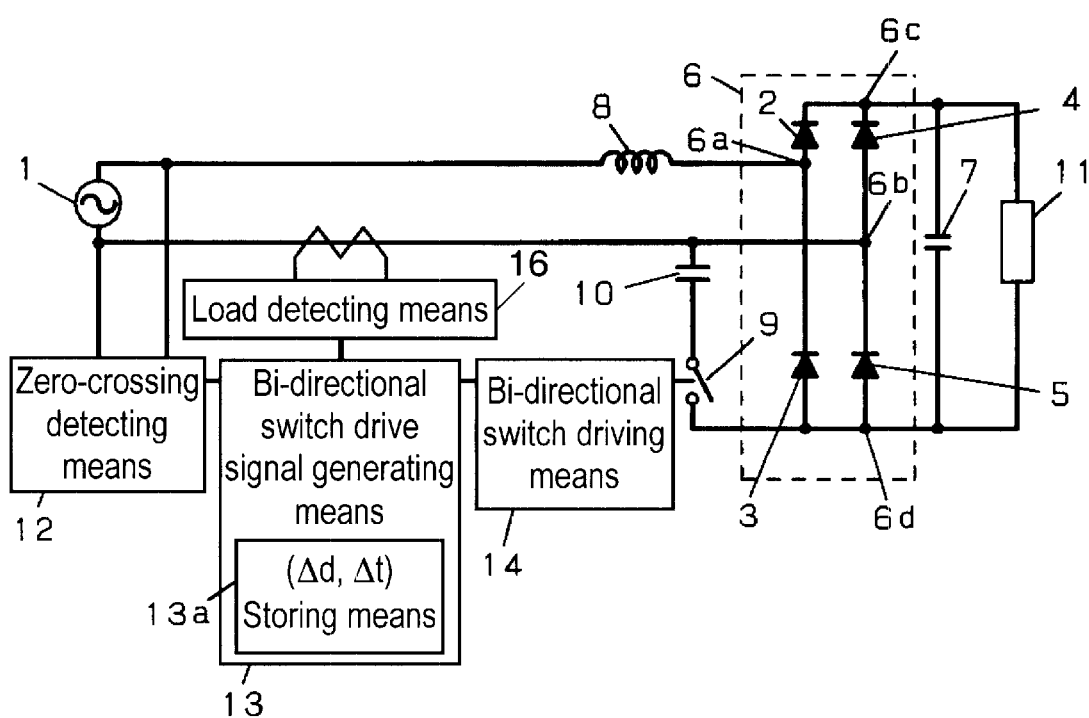
FIG. 5 is a block diagram of a power apparatus in exemplary embodiment 3 of the present invention.

FIG. 5 is a schematic diagram of a power apparatus that has such additions to the power apparatus in exemplary embodiment 1 (FIG. 1) as load detecting means 16 and storing means 13a located inside bi-directional switch drive signal generating means 13 to store specified time Δd from the zero-crossing point and specified time Δt after the turning-on time.

According to the foregoing structure, a table prepared in advance from the values of specified time Δd after the optimum zero-crossing point and specified time Δt after the turning-on time, which are decided in accordance with the magnitude of load, is stored in storing means 13a and, upon receiving an output of load detecting means 16, specified time Δd from the zero-crossing point and specified time Δt after the turning-on time, which correspond to the magnitude of load, are read out of the table. Based on the read out values, a bi-directional switch drive signal is generated, thereby driving bi-directional switch 9 via bi-directional switch driving means 14.

As a result, the optimum power factor, output voltage value and harmonics suppression effect are allowed to be realized against every possible load condition.

Exemplary Embodiment 4

Figure 6:
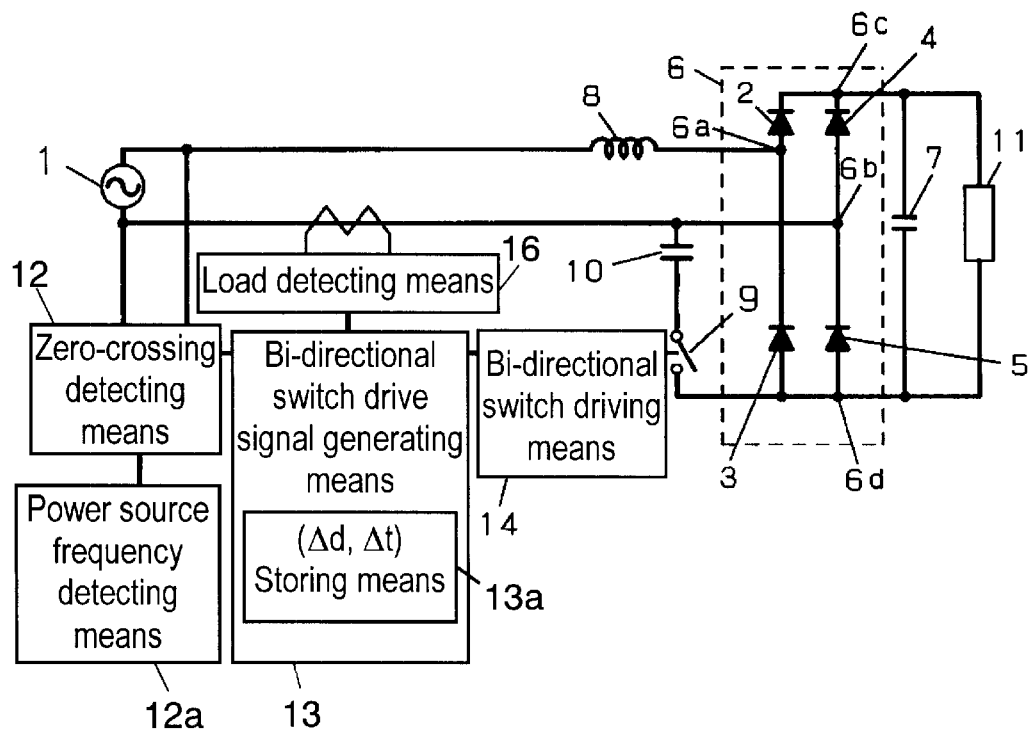
FIG. 6 is a block diagram of a power apparatus in exemplary embodiment 4 of the present invention.
Figure 7:
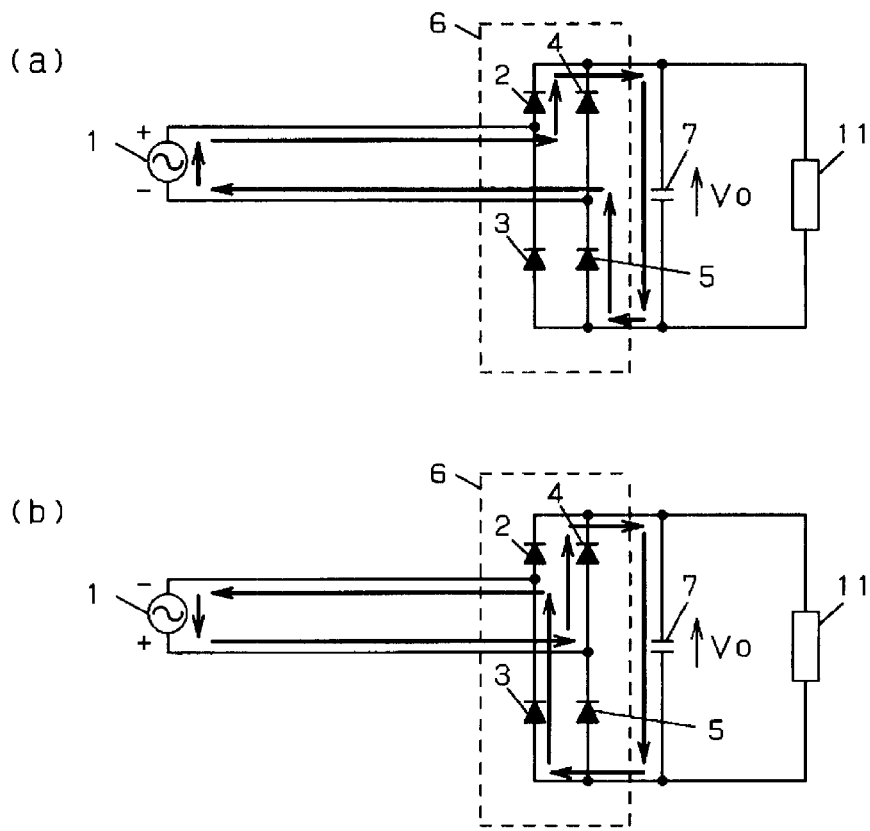
FIG. 7 shows a schematic circuit diagram of a typical prior art power apparatus.

FIG. 6 is a schematic diagram of a power apparatus that has such an addition to the power apparatus in exemplary embodiment 3 (FIG. 5) as power source frequency detecting means 12a. Based on the output of power source frequency detecting means 12a, specified time Δd from the zero-crossing point is set up via bi-directional switch drive signal generating means 13.

When the magnitude of load imposed on load constituting unit 11 falls in a specified range of variation, an appropriate power factor and harmonics suppressing effect are allowed to be realized even if specified time Δd from the zero-crossing point is kept at a certain value without being fine tuned to the magnitude of load. However, against the variation in power source frequency, no appropriate power factor and harmonics suppressing effect can be realized if Δd is not changed in accordance with the power source frequency. It becomes necessary for Δd to be changed to an appropriate value according to the power source frequency of 50 Hz or 60 Hz, for example. Therefore, in the foregoing setup, the power source frequency is detected by power source frequency detecting means 12a and then transmitted to bi-directional switch drive signal generating means 13, thereby allowing bi-directional switch drive signal generating means 13 to set up specified time Δd from the zero-crossing point determined in advance according to the power source frequency. Based on Δd, bi-directional switch driving means 14 drives bi-directional switch 9.

Accordingly, since specified time Δd from the zero-crossing point is set up and controlled according to the variation in power source frequency, specified time Δd from the zero-crossing point is kept as a certain value in the ordinary load variation region, thereby allowing the controlling steps to be simplified and also allowing an appropriate power factor, output voltage value and harmonics suppression effect to be realized regardless of the variation in power source frequency.

Zero-crossing detecting means 12, bi-directional switch drive signal generating means 13, bi-directional switch driving means 14, load detecting means 16, power source frequency detecting means 12a, storing means 13a and the like as described in above are allowed to be realized by the use of circuit arrangements formulated mainly around microcomputers and the like and also program software. (Such circuit arrangements are not shown in the drawings.)

INDUSTRIAL APPLICABILITY

As described in above, according to the present invention, a capacitor is connected via a bi-directional switch between an alternating current input end and a direct current output end of a bridge rectifier circuit, thereby driving a bi-directional switch appropriately.

As a result, the present invention achieves such an advantage as allowing a power apparatus, which can satisfy both requirements of an enhanced power factor and harmonics suppression and also can control a direct current output voltage, to be made available.

What is claimed is:

1. A power apparatus comprising an alternating current power source, a bridge rectifier circuit to subject alternating currents from said alternating current power source to full-wave rectification and a smoothing capacitor connected to a direct current output end of said bridge rectifier circuit, further comprising:
   (a) a reactor connected between said alternating current power source and an alternating current input end of said bridge rectifier circuit;
   (b) a capacitor connected via a bi-directional switch between said alternating current input end and direct current output end of said bridge rectifier circuit;
   (c) a zero-crossing detecting means to detect a zero voltage point of said alternating current power source;
   (d) a bi-directional switch drive signal generating means to generate a drive signal for said bi-directional switch based on an output of said zero-crossing detecting means; and
   (e) a bi-directional switch driving means to drive said bi-directional switch based on a signal of said bi-directional switch drive signal generating means.

2. The power apparatus according to claim 1, wherein said bi-directional switch drive signal generating means generates an on-signal in specified time Δd from zero-crossing.

3. The power apparatus according to claim 2, further comprising a power source frequency detecting means to set specified time Δd from zero-crossing to a different fixed value based on power frequencies.

4. The power apparatus according to claim 2, wherein said bi-directional switch drive signal generating means generates an off-signal in specified time Δt after an on-signal is generated.

5. The power apparatus according to claim 4, wherein specified time Δt starting from an on-time and ending at a time, when an off-signal is generated, is determined based on a direct current output voltage corresponding to a load demand.

6. The power apparatus according to claim 4, wherein a variable range of specified time Δt from an on-time is restricted not to exceed conducting duration Δ to of a bi-directional switch for generating a direct current output voltage needed at a time of maximum load.

7. The power apparatus according to claim 2, further comprising a load detecting means and also a storing means inside a bi-directional switch drive signal generating means to store in advance a combination of specified time Δd from zero-crossing and specified time Δt after an on-time, both being determined according to a magnitude of load, wherein a combination of specified time Δd from zero-crossing and specified time Δt after an on-time, both being determined according to a magnitude of load, is retrieved selectively from said storing means to bring the power apparatus into operation.

8. The power apparatus according to claim 5, further comprising a load detecting means and also a storing means inside a bi-directional switch drive signal generating means to store in advance a combination of specified time Δd from zero-crossing and specified time Δt after an on-time, both being determined according to a magnitude of load, wherein a combination of specified time Δd from zero-crossing and specified time Δt after an on-time, both being determined according to a magnitude of load, is retrieved selectively from said storing means to bring the power apparatus into operation.

* * * * *